United States Patent
Higashide

(10) Patent No.: US 7,590,465 B2
(45) Date of Patent: *Sep. 15, 2009

(54) METHOD AND APPARATUS FOR DETECTING ABNORMAL CHARACTERISTIC VALUES CAPABLE OF SUPPRESSING DETECTION OF NORMAL CHARACTERISTIC VALUES

(75) Inventor: Masanobu Higashide, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 276 days.

This patent is subject to a terminal disclaimer.

(21) Appl. No.: 11/484,622

(22) Filed: Jul. 12, 2006

(65) Prior Publication Data
US 2007/0012085 A1 Jan. 18, 2007

(30) Foreign Application Priority Data
Jul. 12, 2005 (JP) .............................. 2005-203638

(51) Int. Cl.
*G06F 19/00* (2006.01)
(52) U.S. Cl. ..................................................... 700/109
(58) Field of Classification Search ............. 700/28–34, 700/108–111, 121; 702/182–185
See application file for complete search history.

(56) References Cited

U.S. PATENT DOCUMENTS 5,735,546 A * 4/1998 Kurtzberg et al. ............. 283/67
7,254,513 B2 * 8/2007 Lin et al. ..................... 702/179
2004/0249249 A1 * 12/2004 Lawson et al. ............... 600/300
2006/0075314 A1 * 4/2006 Lin et al. ..................... 714/100
2006/0206230 A1 * 9/2006 Higashide ................... 700/121
2006/0224267 A1 * 10/2006 Higashide ................... 700/109
2008/0052040 A1 * 2/2008 Renner ....................... 702/182

FOREIGN PATENT DOCUMENTS

| JP | 2001-67109 | 3/2001 |
| JP | 2001067109 | 3/2001 |
| JP | 2002202806 | 7/2002 |

OTHER PUBLICATIONS

Chinese Office Action dated Dec. 21, 2007 and Translation thereof.

* cited by examiner

*Primary Examiner*—M. N. Von Buhr
(74) *Attorney, Agent, or Firm*—Young & Thompson

(57) ABSTRACT

In a method for detecting abnormal characteristic values of at least three products sequentially manufactured in the same manufacturing line, it is determined whether or not a successively-alternate increase/decrease tendency has occurred in a plurality of sequentially-obtained characteristic values of the products. Also, it is determined whether or not at least one of the characteristic values is located within a control region narrower than an allowable region and outside a normal region narrower than the control region. Further, when the successively-alternate increase/decrease tendency has occurred and the at least one characteristic value is located within the control region outside the normal region, an alarm state is detected.

12 Claims, 15 Drawing Sheets

METHOD AND APPARATUS FOR DETECTING ABNORMAL CHARACTERISTIC VALUES CAPABLE OF SUPPRESSING DETECTION OF NORMAL CHARACTERISTIC VALUES

BACKGROUND OF THE INVENTION

1. Field of the Invention

The present invention relates to a method and apparatus for detecting abnormal characteristic values of a plurality of products or lots sequentially manufactured in the same manufacturing line.

2. Description of the Related Art

In a first prior art abnormal characteristic value detecting method (see: JP-2001-67109 A), measured characteristic values depending upon lot numbers manufactured in the same manufacturing line have to fall within an allowable region. That is, when a measured-characteristic value is outside the allowable region, a respective lot of this measured characteristic value is deemed to be defective, so that the respective lot is scrapped. Also, in order to decrease the number of scrapped lots, measured characteristic values are controlled to fall within a control region narrower than the allowable region. That is, when a measured characteristic value is within the allowable region but outside the control region, i.e., within an alarm region, an alarm signal is generated to carry out a countermeasure operation. Such a measured characteristic value is called an abnormal characteristic value. This will be explained later in detail.

In the above-described first prior art abnormal characteristic value detecting method, however, even if a successively-alternate increase/decrease tendency is generated in the measured characteristic values, no alarm signal is generated so that a measured characteristic value would be outside the allowable region due to the delay of an advance countermeasure operation.

In a second prior art abnormal characteristic value detecting method, if a certain successively-alternate increase/decrease tendency is generated even within the control region, an alarm signal is generated to prevent other measured characteristic values from being outside the allowable region. The last measured characteristic value of the tendency is called an abnormal characteristic value. This also will be explained later in detail.

Note that a "successively-alternate increase/decrease tendency" is defined such that, under the condition that first, second, third, fourth, . . . characteristic values are sequentially measured, if the second characteristic value is increased as compared with the first characteristic value, the third characteristic value is decreased as compared with the second characteristic value, the fourth characteristic value is increased as compared with the third characteristic value, and so on. Such a successively-alternate increase/decrease tendency would be caused by the difference in performance between manufacturing units or between measuring units in the same manufacturing line. Also, sequentially-measured characteristic values are obtained from sequentially-manufactured products in the same manufacturing line. In this case, however, "sequentially-manufactured products" do not always mean all sequentially-manufactured products but every k-th ones (k=2, 3, . . . ) of the sequentially-manufactured products upon which measuring operations are performed.

SUMMARY OF THE INVENTION

In the above-described second prior art abnormal characteristic value detecting method, however, even if measured characteristic values have a successively-alternate small increase/decrease tendency stably around the control center value, unnecessary alarm signals are generated to request unnecessary countermeasure operations.

According to the present invention, in a method for detecting abnormal characteristic values of at least three products sequentially manufactured in the same manufacturing line, it is determined whether or not a successively-alternate increase/decrease tendency has occurred in a plurality of sequentially-obtained characteristic values of the products. Also, it is determined whether or not at least one of the characteristic values is located within a control region narrower than an allowable region and outside a normal region narrower than the control region. Further, when the successively-alternate increase/decrease tendency has occurred and the at least one characteristic value is located within the control region outside the normal region, an alarm state is detected. In other words, even when the successively-alternate increase/decrease tendency has occurred, if no characteristic value is located within the control region outside the normal region, no alarm state is detected.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENT

Before the description of the preferred embodiment, prior art abnormal characteristic value detecting methods will now be explained with reference to FIGS. 1, 2, 3 and 4.

Figure 1:
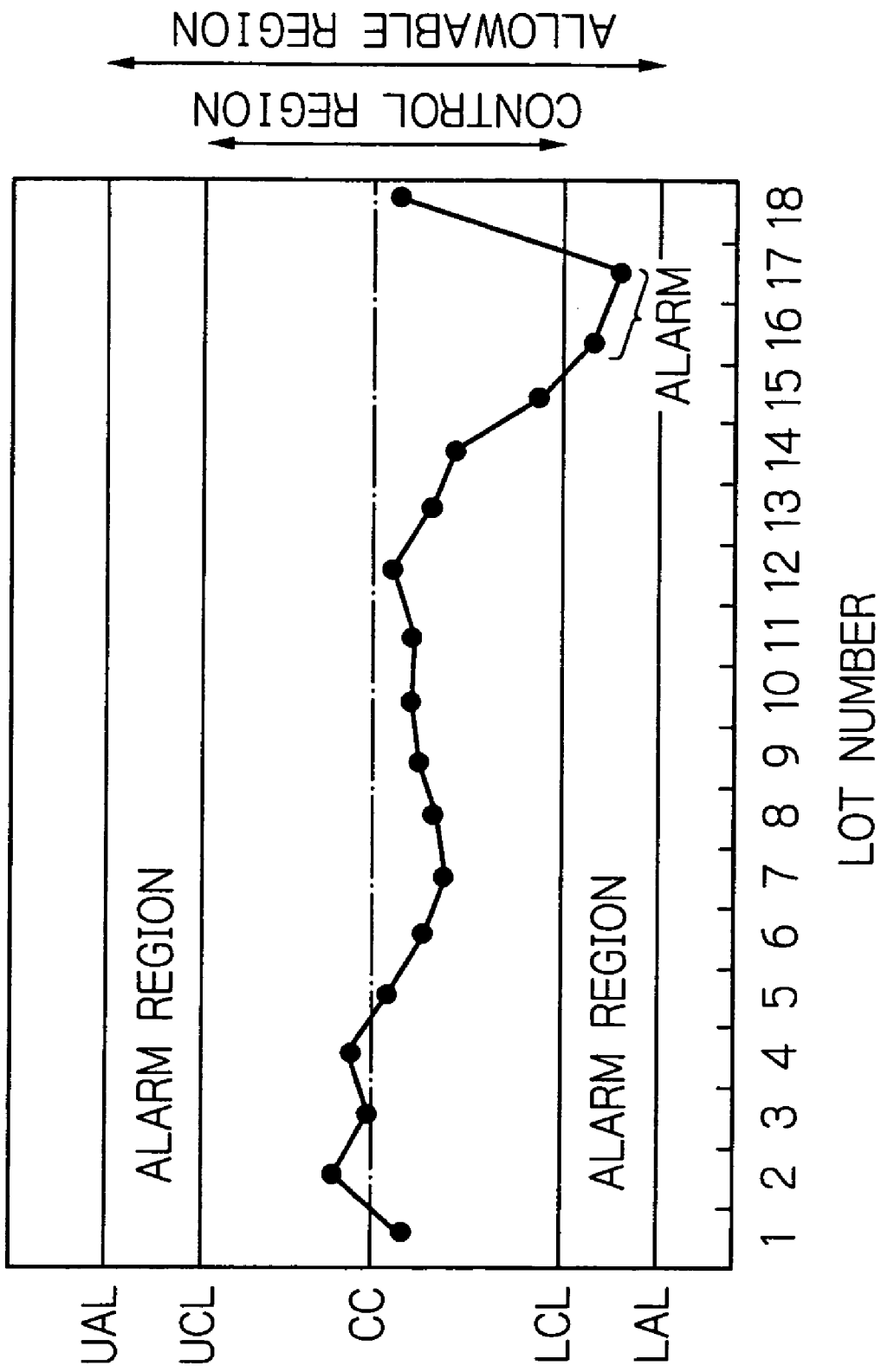
FIG. 1 is a graph for explaining a first prior art abnormal characteristic value detecting method.

In FIG. 1, which is a graph for explaining a first prior art abnormal characteristic value detecting method (see: JP-2001-67109-A), measured characteristic values depending upon sequential numbers such as lot members manufactured in the same manufacturing line have to fall within an allowable region and are controlled to be in a control region narrower than the allowable region.

The allowable region is defined by a lower allowable limit value LAL and an upper allowable limit value UAL (>LAL) centered at a control center value CC. Also, the control region is included in the allowable region and is defined by a lower control limit value LCL (>LAL) and an upper control limit value UCL (<UAL) centered at the control center value CC.

In this case, an alarm region is defined by the lower allowable limit value LAL and the lower control limit value LCL, and another alarm region is defined by the upper allowable limit value UAL and the upper control limit value UCL.

When a currently-measured or last characteristic value is outside the allowable region, a respective lot of this measured characteristic value is deemed to be defective, so that a defect signal is generated.

When a currently-measured or last characteristic value is within the allowable region but outside the control region, i.e., within one of the alarm regions, alarm signals are generated for the lots 16 and 17 as shown in FIG. 1 to carry out an advance countermeasure operation.

When a currently-measured or last characteristic value is within the control region, a respective lot of this measured characteristic value is deemed to be normal, so that no defect signal and no alarm signal are generated.

Figure 2:
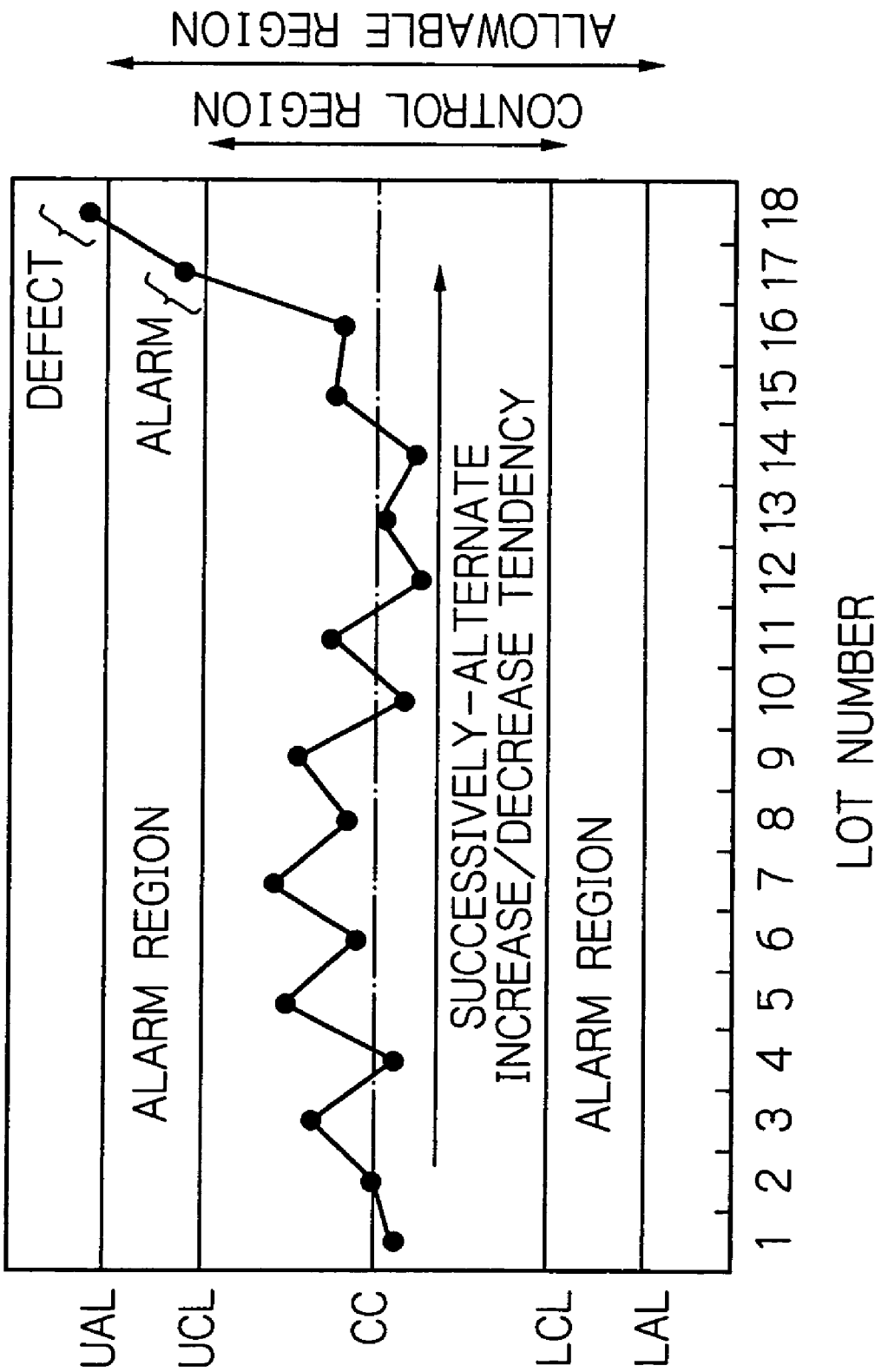
FIG. 2 is a graph for explaining the problem in the first prior art abnormal characteristic value detecting method of FIG. 1.

In the first prior art abnormal characteristic value detecting method of FIG. 1, however, even if a successively-alternate increase/decrease tendency is generated in the measured characteristic values of the lots 3, 4, . . . , 16 as shown in FIG. 2, no alarm signal is generated for the lot 16, although alarm signals are generated only for the lot 17 in the alarm region. As a result, an advance countermeasure operation is delayed due to the delay of the generation of the alarm signals, so that the measured characteristic value of the lot 18 would be outside the allowable region so that the lot 18 is deemed to be defective as shown in FIG. 2.

Figure 3:
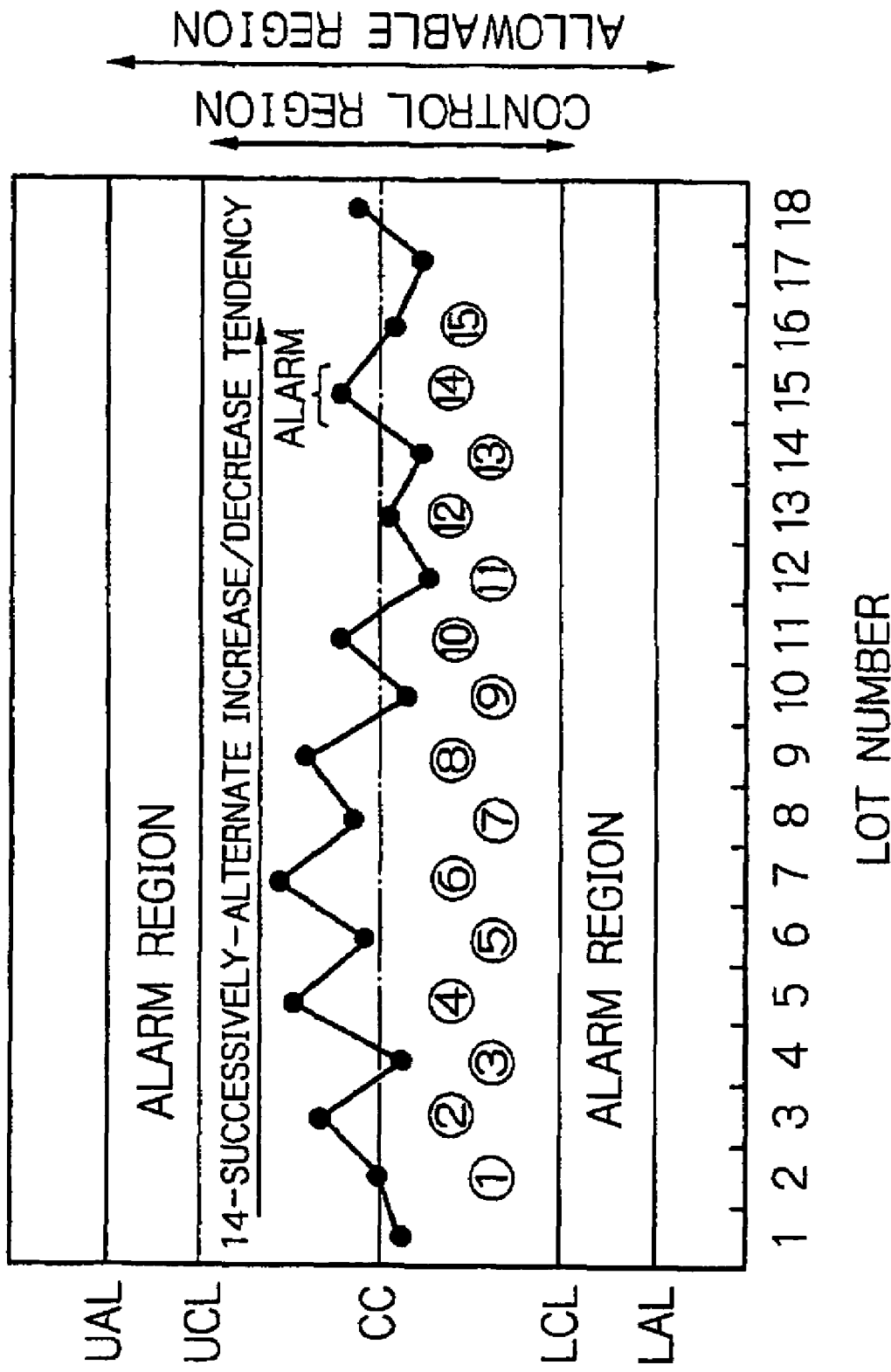
FIGS. 3, 4 and 5 are graphs for explaining a second prior art abnormal characteristic value detecting method.

In FIG. 3, which is a graph for explaining a second prior art abnormal characteristic value detecting method, if a "fourteen-successively-alternate increase/decrease tendency" is generated even within the control region, an alarm signal is generated at the last lot thereof to suppress the delay of generation of alarm signals. That is, even if the measured characteristic values of the fourteen successive lots 2, 3, . . . , 15 are alternately increased and decreased an alarm signal is generated for the last lot 15. Note that "fourteen" of the fourteen-successively-alternate increase/decrease tendency is defined by Japanese Industrial Standards (JIS) Z9021. As a result, a countermeasure operation is carried out to prevent the measured characteristic values of the lots 16, 17 and 18 from being outside the allowable region.

Figure 4:
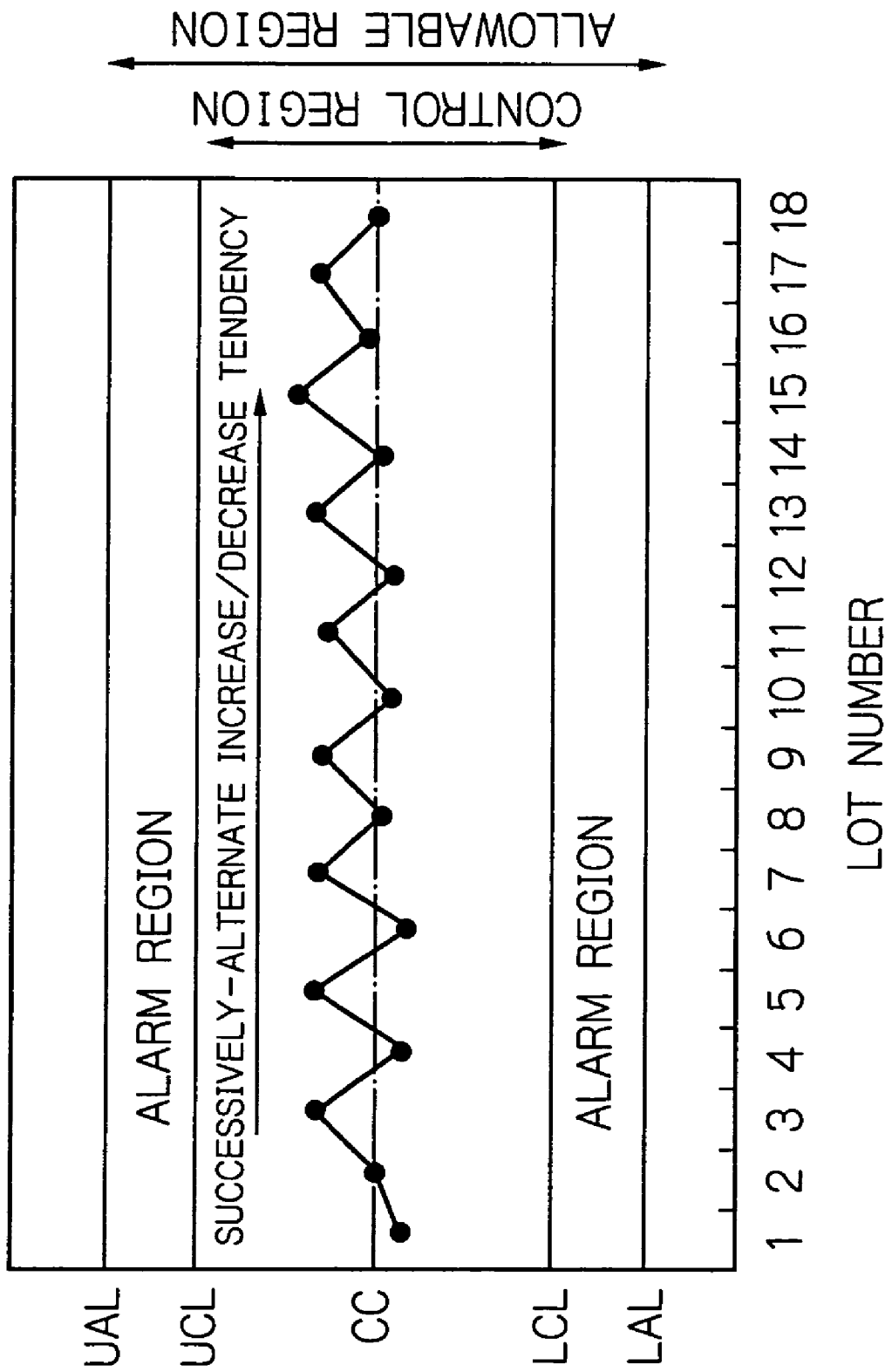

Note that, if a successively-alternate large increase/decrease tendency occurs as illustrated in FIG. 4, a difference in performance is supposed to be generated between a plurality of manufacturing units, or between a plurality of characteristic value measuring units. In this case, manufacturing process engineers need to search for an abnormal portion in the manufacturing units or the characteristic value measuring units.

Figure 5:
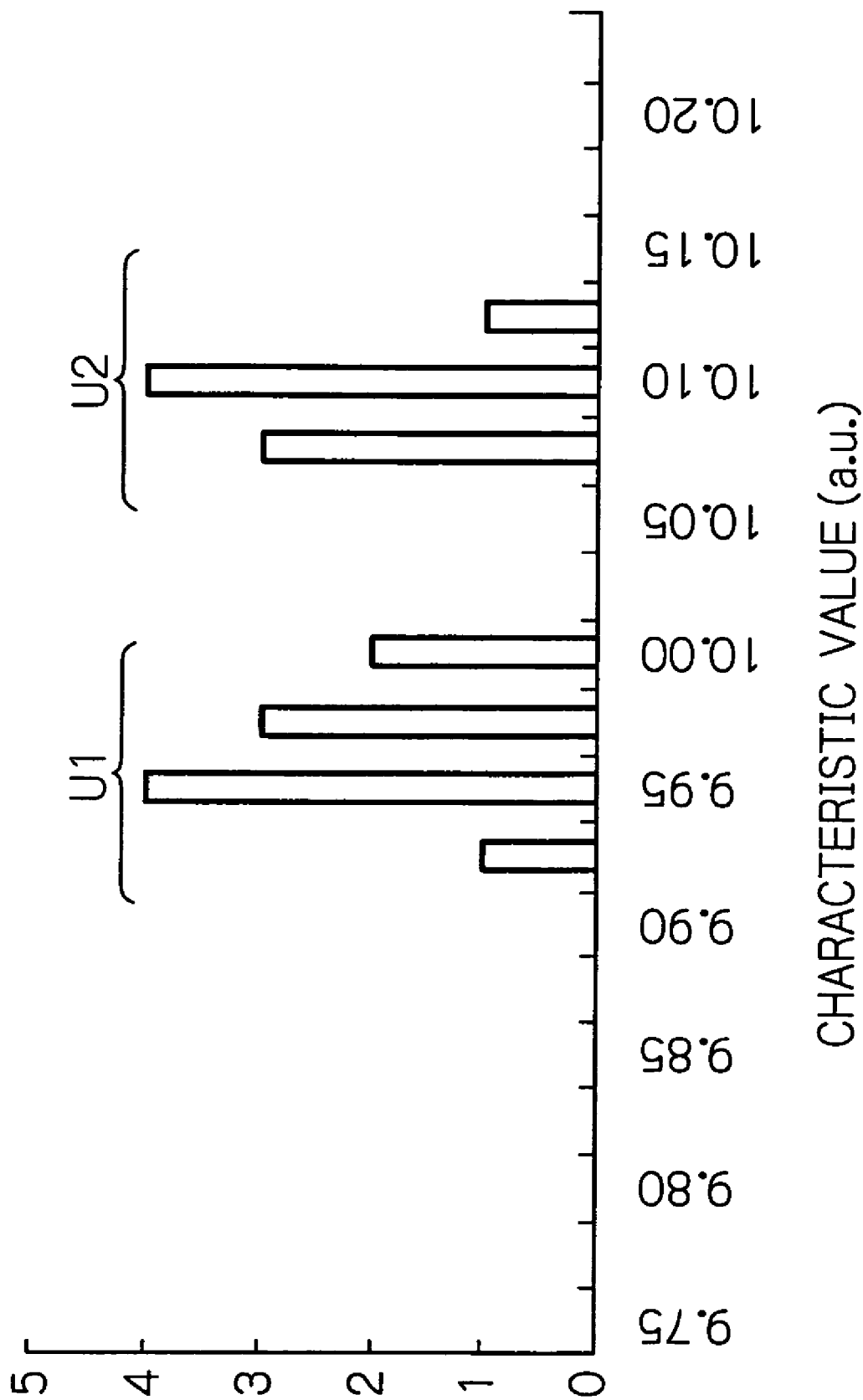

For example, in order to form a silicon dioxide layer on a semiconductor substrate, thermal oxidation units, chemical vapor deposition (CVD) units or sputtering units are used as manufacturing units, and ellipsometers or the like are used as characteristic value (silicon dioxide thickness) measuring units. For example, as illustrated in FIG. 5, if two thermal oxidation units U1 and U2 and one ellipsometer are used, the above-mentioned large successively-alternate increase/decrease tendency indicates that there is a difference in performance between the thermal oxidation units U1 and U2. Therefore, manufacturing process engineers search for an abnormal portion in the thermal oxidation units.

Figure 6:
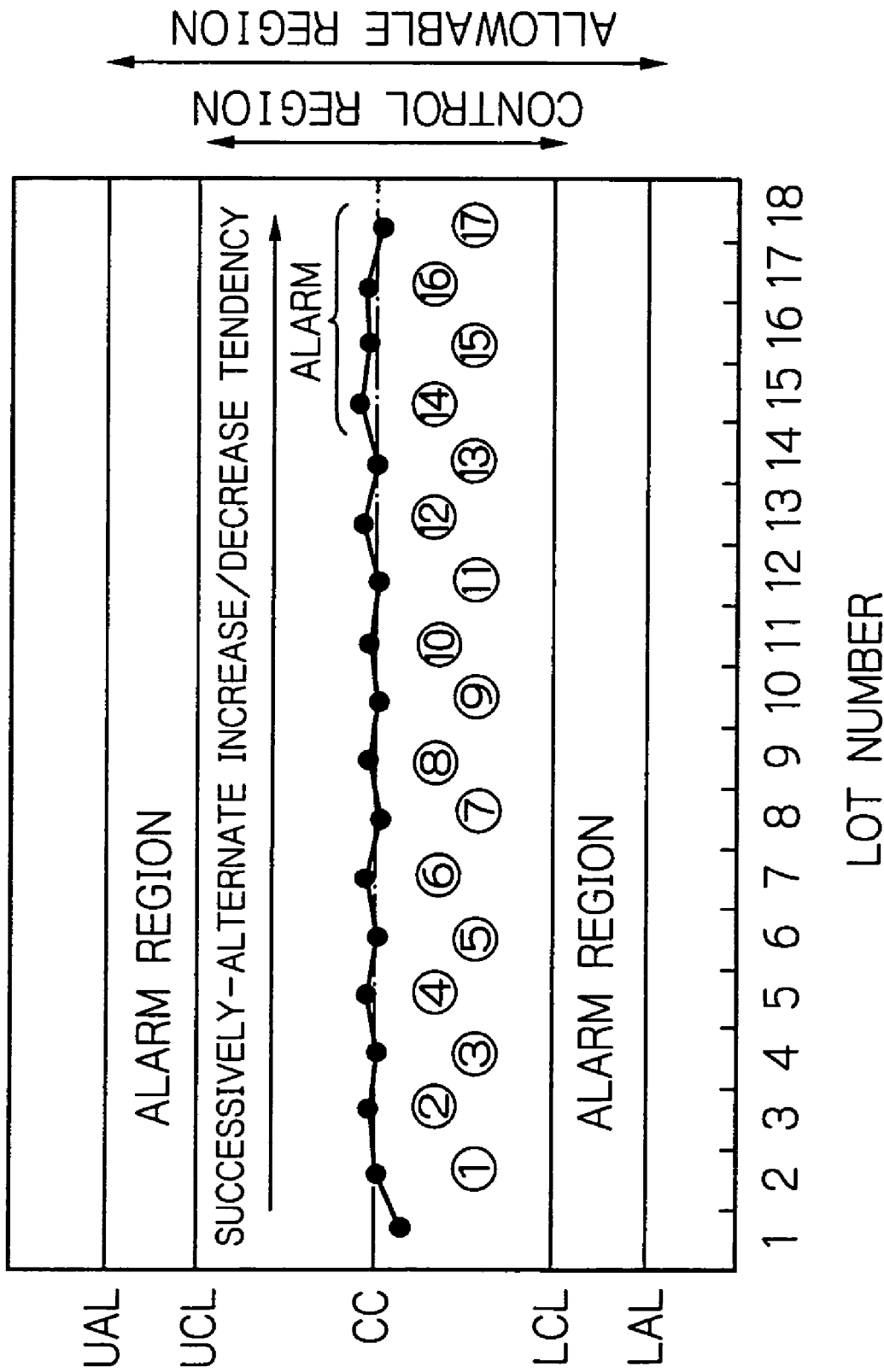
FIG. 6 is a graph for explaining the problem in the second prior art abnormal characteristic value detecting method of FIG. 3.

In the second prior art abnormal characteristic value detecting method of FIG. 3, however, even if the measured characteristic values of the lots 2, 3, . . . , 18 have a successively-alternate small increase/decrease tendency as shown in FIG. 6 stably around the control center value CC, unnecessary alarm signals are generated for the lots 15, 16, 17 and 18 as shown in FIG. 6, to request unnecessary countermeasure operations. That is, even when the manufacturing units and the characteristic value measuring units are accurately adjusted, a successively-alternate increase/decrease tendency having a very small amplitude always occurs around the control center value CC. Therefore, no alarm signals are necessary for the lots 15, 16, 17 and 18 in FIG. 6.

Figure 7:
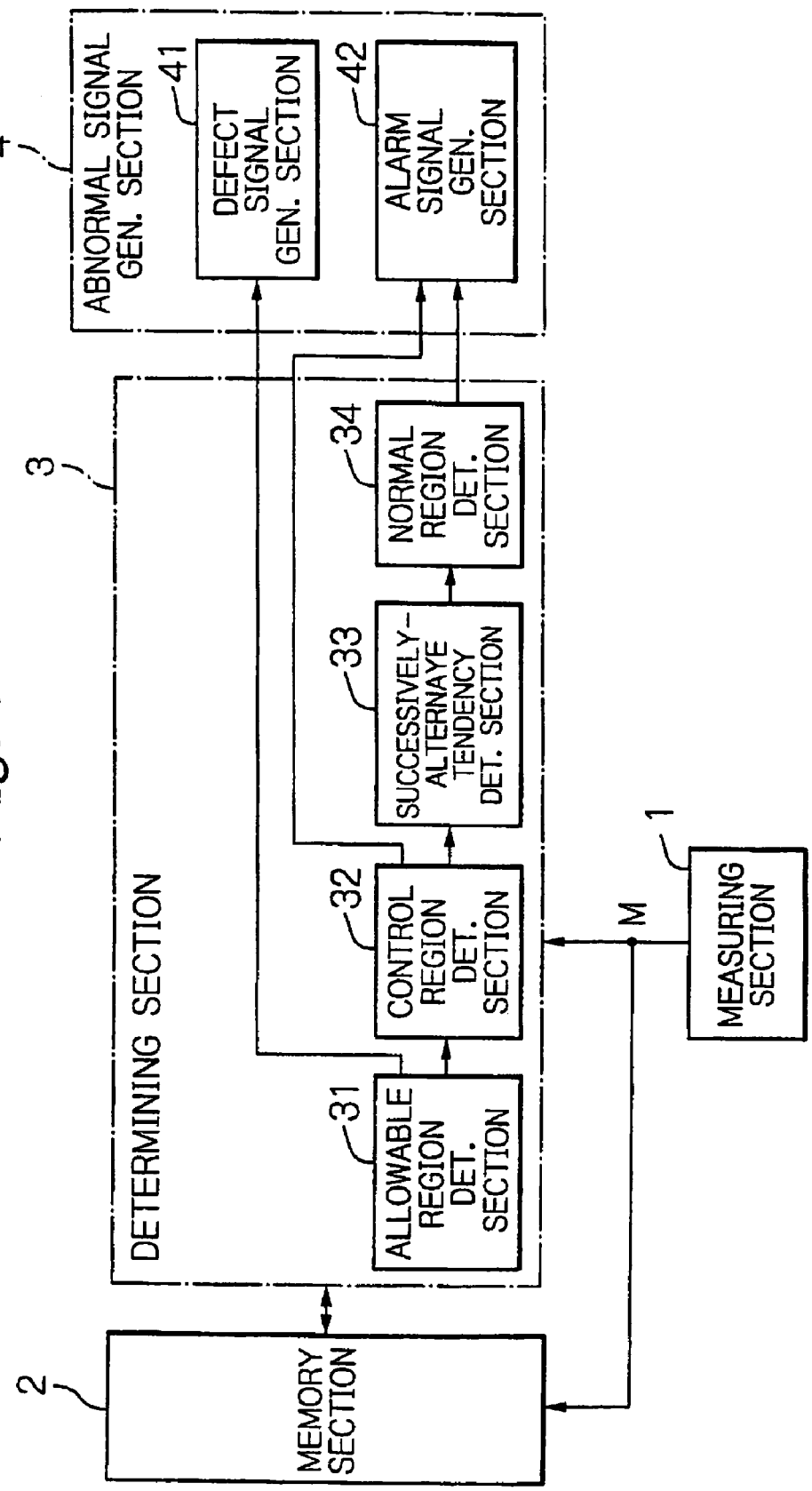
FIG. 7 is a block circuit diagram illustrating an embodiment of the abnormal characteristic value detecting apparatus according to the present invention.

In FIG. 7, which illustrates an embodiment of the abnormal characteristic value detecting apparatus according to the present invention, a measuring section 1 such as an ellipsometer measures a characteristic value M such as a thickness of silicon dioxide formed on a semiconductor substrate. The measuring section 1 can measure the characteristic values of semiconductor wafers of all lots or selected lots.

A memory section 2 stores not only measured characteristic values and other temporary data, but also constants and programs.

A determining section 3 is constructed by an allowable region determining section 31, a control region determining section 32, a successively-alternate increase/decrease tendency determining section 33 and a normal region determining section 34.

Figure 8:
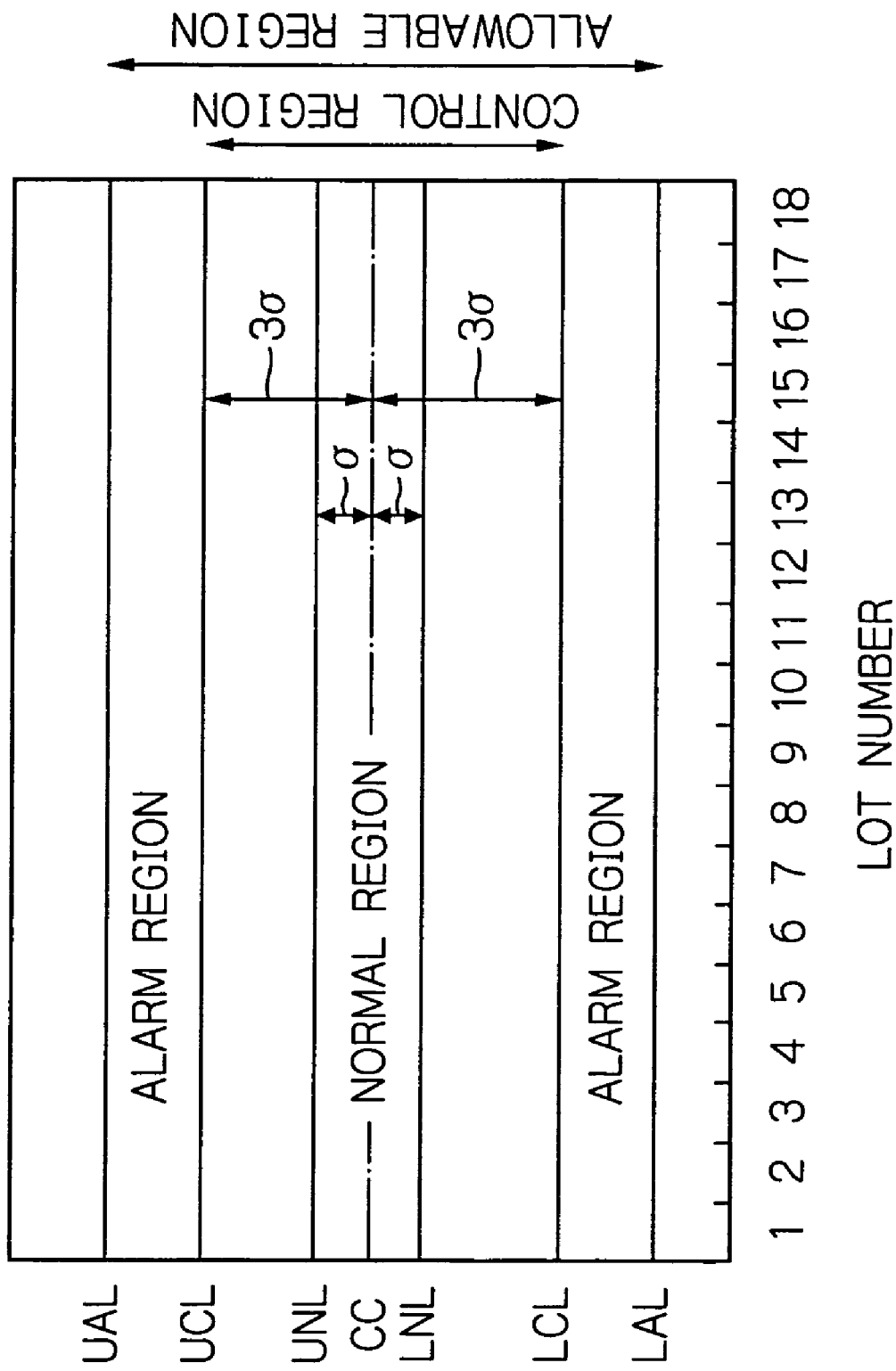
FIG. 8 is a graph for explaining the allowable region, the control region and the normal region of FIG. 7.

The allowable region determining section 31 determines whether or not a measured characteristic value M is located within an allowable region defined by a lower allowable limit value LAL and an upper allowable limit value UAL centered at a control center value CC as shown in FIG. 8.

When the measured characteristic value M is located within the allowable region, the control region determining section 32 determines whether or not the measured characteristic value M is located within a control region defined by a lower control limit value LCL and an upper control limit value UCL centered at the control center value CC as shown in FIG. 8. In this case,

LAL<LCL<CC

CC<UCL<UAL

When the measured characteristic value M is located within the control region, the successively-alternate increase/decrease tendency determining section 33 determines whether or not there is a fourteen-successively-alternate increase/decrease tendency in the measured characteristic values M.

When there is a fourteen-successively-alternate increase/decrease tendency in the measured characteristic values, the normal region determining section 34 determines whether or not at least one of the measured characteristic values is located within a normal region defined by a lower normal limit value LNL and an upper normal limit value UNL as shown in FIG. 8. In this case,

LCL<LNL<CC

CC<UNL<UCL

An abnormal signal generating section 4 is constructed by a defect signal generating section 41 and an alarm signal generating section 42.

When the currently-measured or last characteristic value M is determined to be located outside the allowable region, the defect signal generating section 41 generates a defect signal adapted to activate a first sound element or a first visual element (not shown).

When the currently-measured or last characteristic value M is determined to be located within the allowable region but outside the control region, and when at least one of the measured characteristic values is within the control region but outside the normal region and a fourteen-successively-alternate increase/decrease tendency occurs therein, the alarm signal generating section 42 generates an alarm signal adapted to activate a second sound element or a second visual element (not shown).

In FIG. 8, note that $$CC-LCL=UCL-CC=3\sigma$$

$$CC-LNL=UNL-CC=\sigma$$

where $\sigma$ is a standard deviation of the measured characteristic values M if they have a normal distribution within the allowable region.

Figure 9:
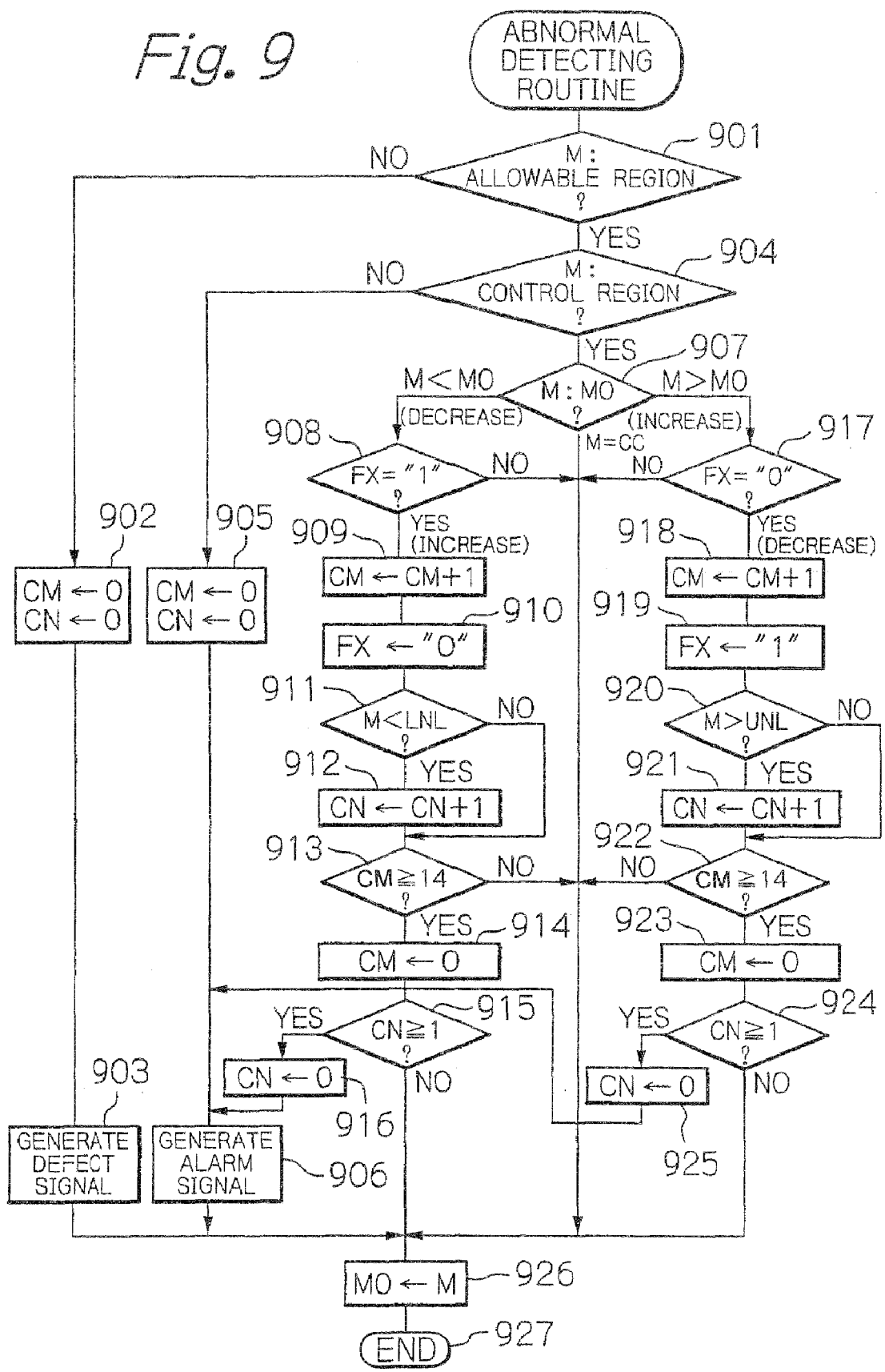
FIG. 9 is a flowchart for explaining the operation of the abnormal characteristic value detecting apparatus of FIG. 7.

The memory section 2, the determining section 3 and the abnormal signal generating section 4 of FIG. 7 are constructed by a computer formed of a central processing unit (CPU), a random access memory (RAM) for storing the measured characteristic values and other temporary data, a read-only memory (ROM) for storing constants and programs, and so on. In this case, the operation of the CPU is carried out by a flowchart as illustrated in FIG. 9. In FIG. 9, an initial routine (not shown) is carried out in advance, so that an increase/decrease counter value CM and an out-of-normal-region counter value CN are initialized at 0, a previously-measured characteristic value MO is initialized at the center control value CC, and an increase/decrease flag FX is initialized at 0. In this case, FX="0" means that the currently-measured characteristic value M is decreased as compared with its previously-measured characteristic value MO, while FX="1" means that the currently-measured characteristic value M is increased as compared with its previously-measured characteristic value M. Note that the routine of FIG. 9 is carried out every time the measuring section 1 generates a measured characteristic value fetch request signal to be sent to the computer.

First, at step 901, it is determined whether or not the measured characteristic value M is within the allowable region, i.e., $$LAL<M<UAL.$$

As a result, when the measured characteristic value M is not within the allowable region (M≦LAL or M≧UAL), the control proceeds to step 902 which resets the increase/decrease counter value CM and the out-of-normal-region counter value CN (CM=CN=0). Also, at step 903, a defect signal is generated. As a result, a respective lot of this measured characteristic value is deemed to be defective.

On the other hand, at step 901, when it is determined that the measured characteristic value M is within the allowable region (LAL<M<UAL), the control proceeds to step 904 which determines whether or not the measured characteristic value M is within the control region, i.e., $$LCL<M<UCL.$$

As a result, when the measured characteristic value M is not within the control region (M≦LCL or M≧UCL), the control proceeds to step 905 which resets the increase/decrease counter value CM and the out-of-normal-region counter value CN (CM=CN=0). Also, at step 906, an alarm signal is generated. As a result, a countermeasure operation would be carried out.

On the other hand, at step 904, when it is determined that the measured characteristic value M is within the control region (LCL<M<UCL), the control proceeds to step 907 which determines whether or not the measured characteristic value M is smaller than MO, equal to MO, or larger than MO. As a result, when M<MO (decrease state), the control proceeds to steps 908 through 916. Also, when M>MO (increase state), the control proceeds to steps 917 through 925. Further, when M=MO, the control proceeds directly to step 926.

At step 908, it is determined whether or not the increase/decrease flag FX is "1" (increase state). Only when FX="1" which means the characteristic values M are switched from an increase state to a decrease state, does the control proceed to step 909 which increases the increase/decrease counter value CM by 1, i.e., CM=CM+1, and then, at step 910, the increase/decrease flag is reset (FX="0"). Otherwise, the control proceeds directly to step 926.

Next, at step 911, it is determined whether or not M<LNL, i.e., the last measured characteristic value M is within the normal region. As a result, only when M<LNL, does the control proceed to step 912 which increments the out-of-normal-region counter value CN by +1. Then, as step 913, it is determined whether or not CM≧14, i.e., a fourteen-successively-alternate increase/decrease tendency occurs in the measured characteristic values M. Only when CM≧14, does the control proceed to step 914 which resets the increase/decrease counter value CM, i.e., CM=0. Then, at step 915, it is determined whether or not CN≧1. Only when CN≧1, does the control proceed to step 916 which resets the counter value CN, and then proceed to step 906 which generates an alarm signal. Thus, when the fourteen successively-alternate increase/decrease tendency occurs and at least one of the characteristic values is within the control region outside the normal region, an alarm signal is generated.

On the other hand, at step 917, it is determined whether or not the increase/decrease flag FX is "0" (decrease state). Only when FX="0" which means the characteristic values M are switched from a decrease state to an increase state, does the control proceed to step 918 which increases the increase/decrease counter value CM by 1, i.e., CM=CM+1, and then, at step 919, the increase/decrease flag is set (FX="1"). Otherwise, the control proceeds directly to step 926.

Next, at step 920, it is determined whether or not M>UNL, i.e., the last measured characteristic value M is within the normal region. As a result, only when M>UNL, does the control proceed to step 921 which increments the out-of-normal-region counter value CN by +1. Then, as step 922, it is determined whether or not CM≧14, i.e., a fourteen-successively-alternate increase/decrease tendency occurs in the measured characteristic values M. Only when CM≧14, does the control proceed to step 923 which resets the increase/decrease counter value CM, i.e., CM=0. Then, at step 924, it is determined whether or not CN≧1. Only when CN≧1, does the control proceed to step 925 which resets the counter value CN, and then proceed to step 906 which generates an alarm signal. Thus, in this case, when the fourteen successively-alternate increase/decrease tendency occurs and at least one of the characteristic values is within the control region outside the normal region, an alarm signal is generated.

The control at steps 903 and 906 proceeds to step 926. Also, when the out-of-normal-region counter value CN is 0 at step 915 or 924, the control proceeds to step 926. At step 926, the previously-measured characteristic value MO is replaced by the currently-measured characteristic value M, and the control proceeds to step 927 which prepares for the next measured characteristic value fetch request signal.

Figure 10:
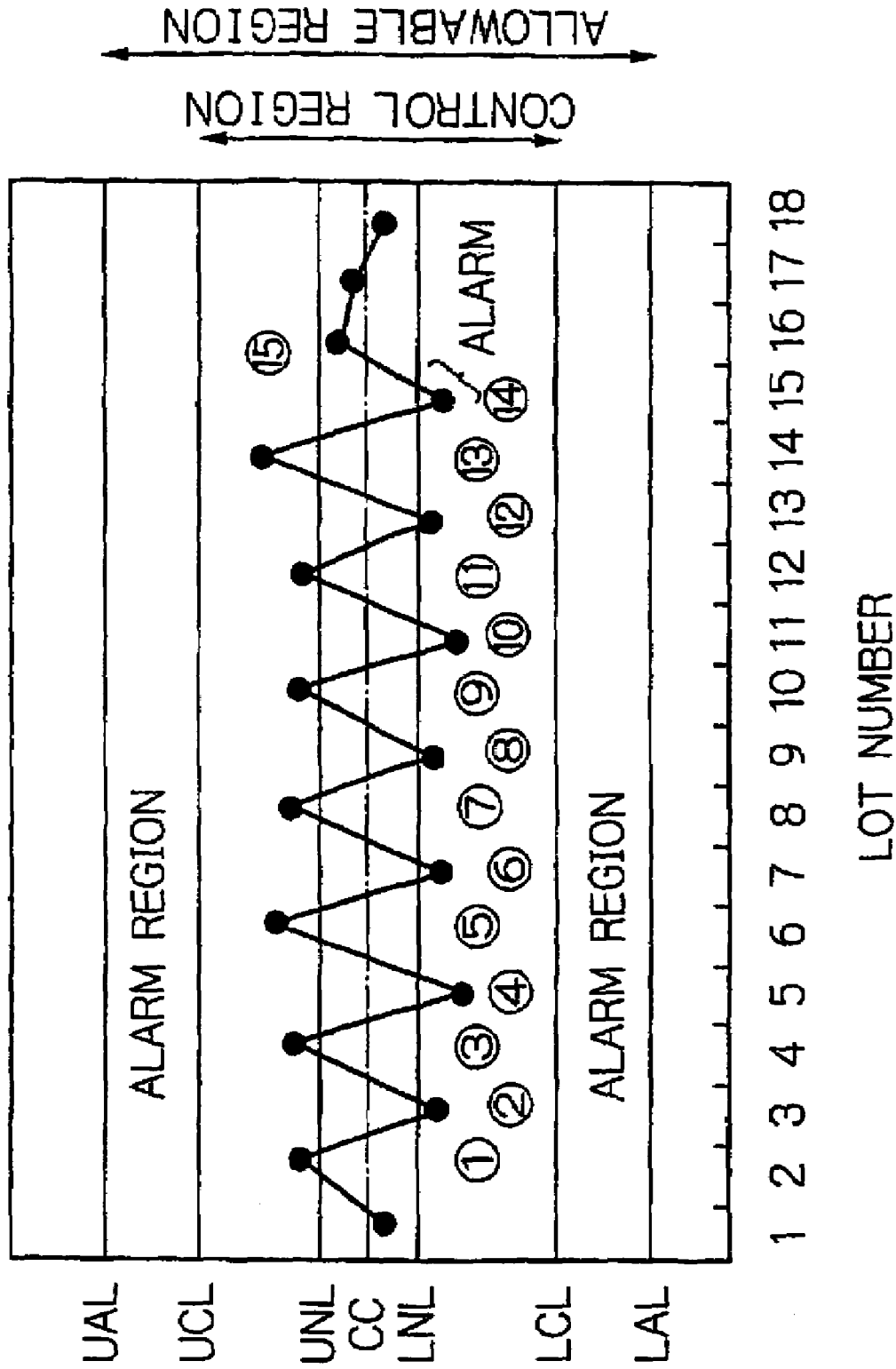
FIGS. 10, 11 and 12 are graphs for explaining the flowchart of FIG. 9.

According to a first example as illustrated in FIG. 10, if a "fourteen-successively-alternate increase/decrease tendency" is generated even within the control region, an alarm signal is generated at the last lot 15 to suppress the delay of generation of alarm signals. That is, an alarm signal is generated for the last lot 15. As a result, a countermeasure operation is carried out to prevent the measured characteristic values M of the lots 16, 17 and 18 from being outside the allowable region.

Figure 11:
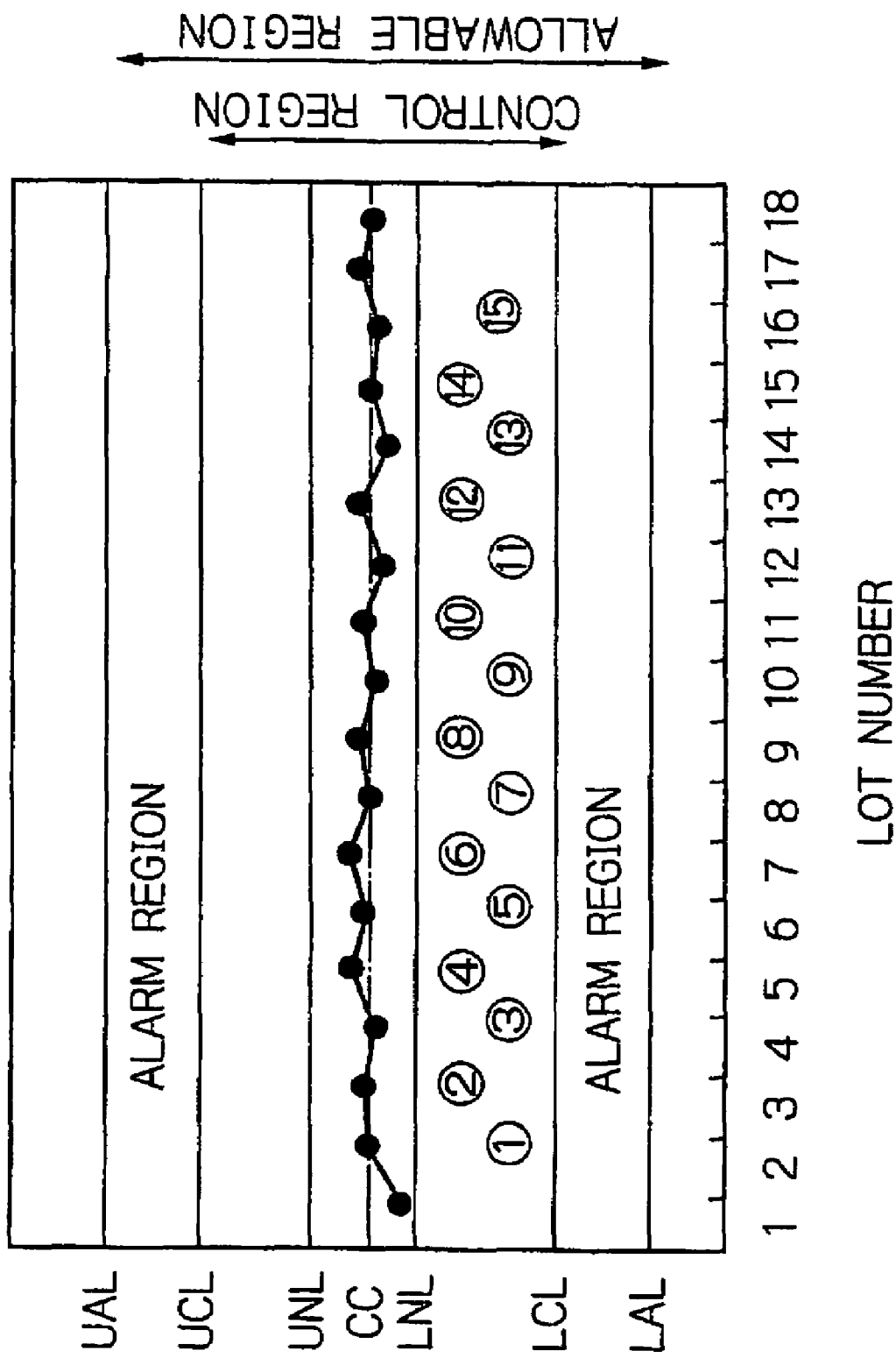

According to a second example as illustrated in FIG. 11, even if the measured characteristic values M of the lots 1, 2, ..., 15 have a successively-alternate increase/decrease tendency stably around the control center value CC, unnecessary alarm signals are not generated, so that unnecessary countermeasure operations are not requested.

Figure 12:
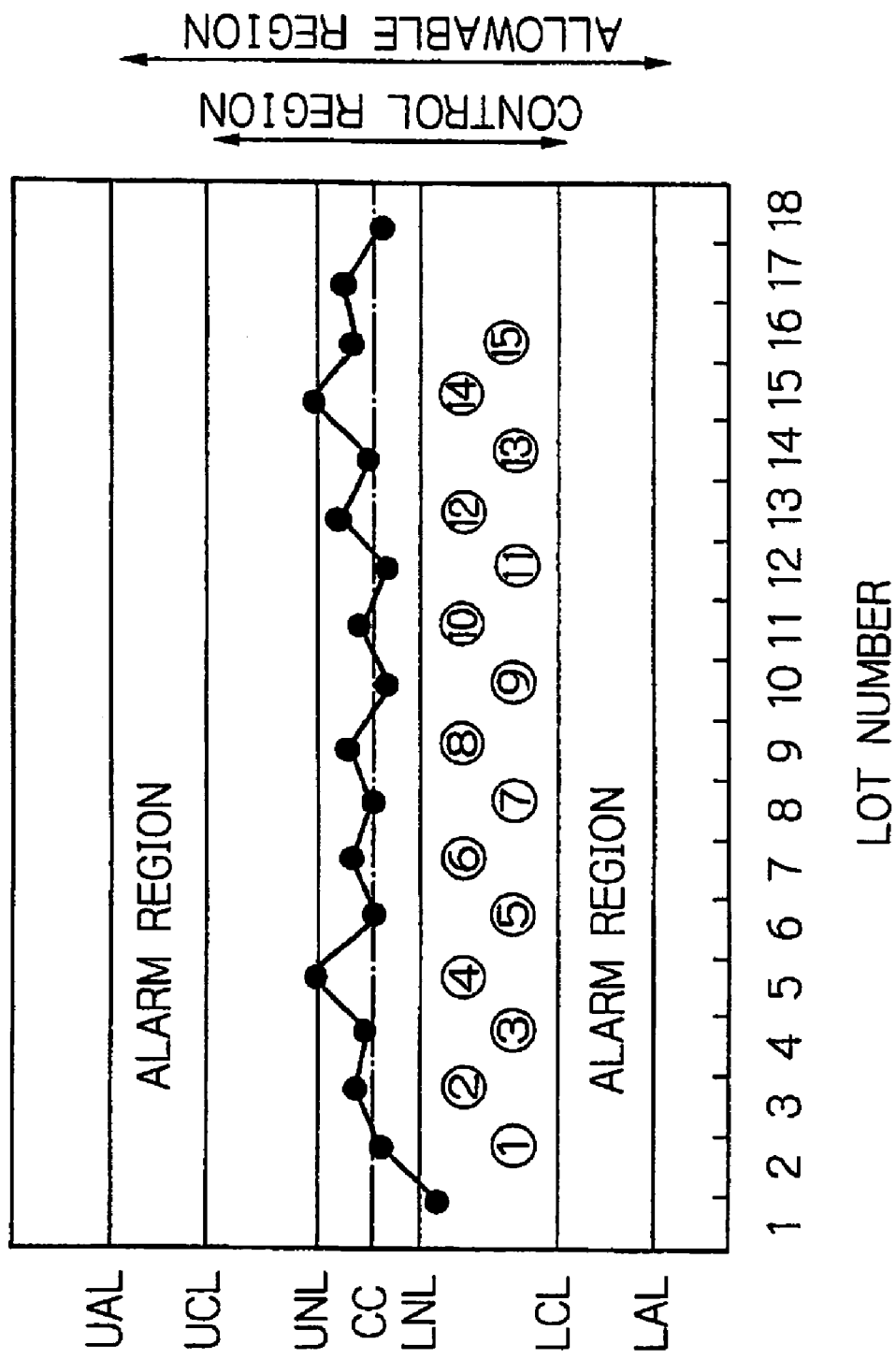

According to a third example as illustrated in FIG. 12, if the measured characteristic values M of the lots 1, 2, ..., 15 have a successively-alternate increase/decrease tendency around the control center value CC, but the measured characteristic values of the lots 4 and 14 are out of the normal region, a countermeasure operation is carried out. In this case, if the value "1" at steps 915 and 924 is replaced by "2", unnecessary alarm signals are not generated, so that unnecessary countermeasure operations are not requested.

Figure 13:
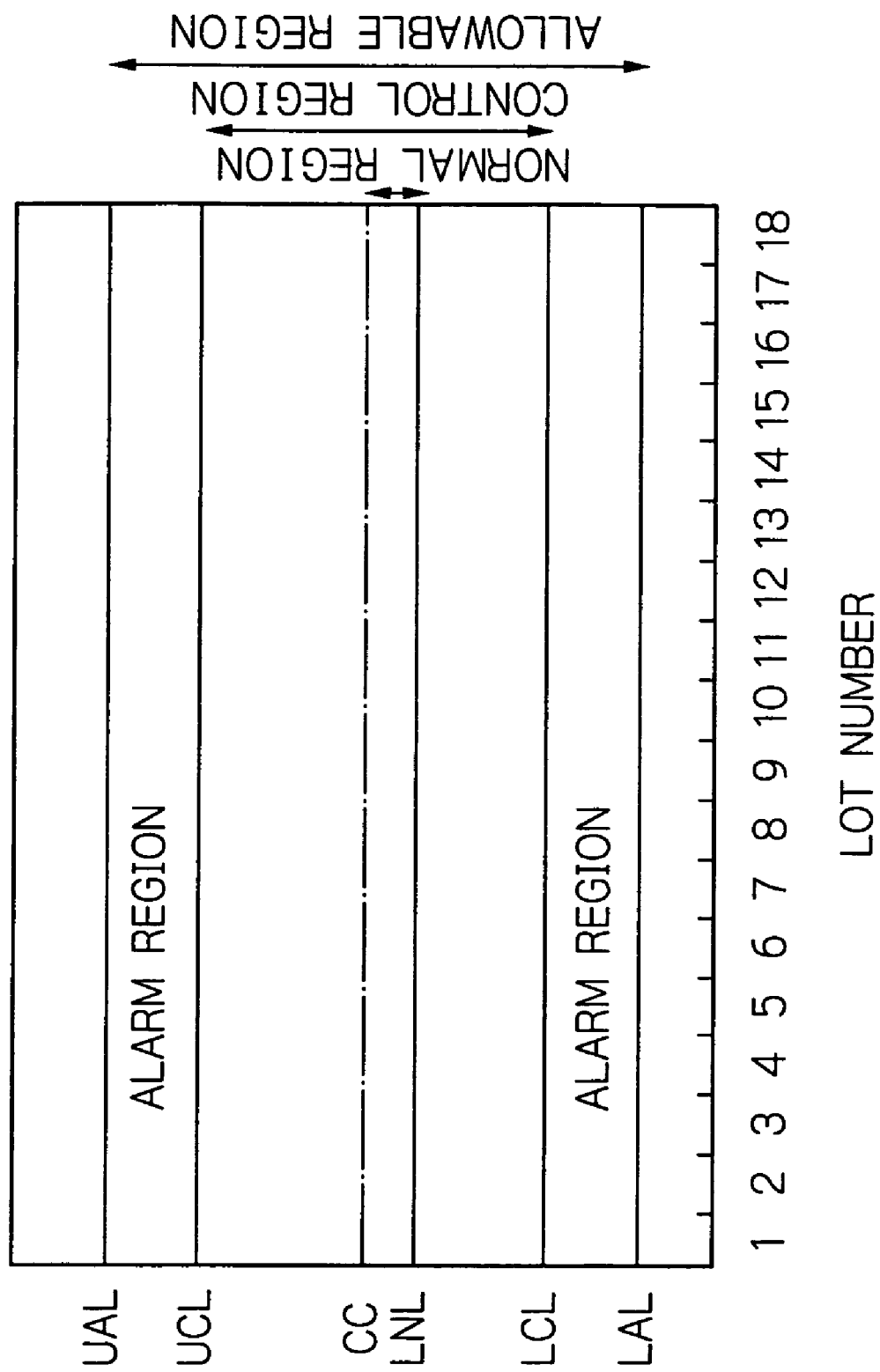
FIGS. 13, 14 and 15 are graphs illustrating modifications of the graph of FIG. 8.
Figure 14:
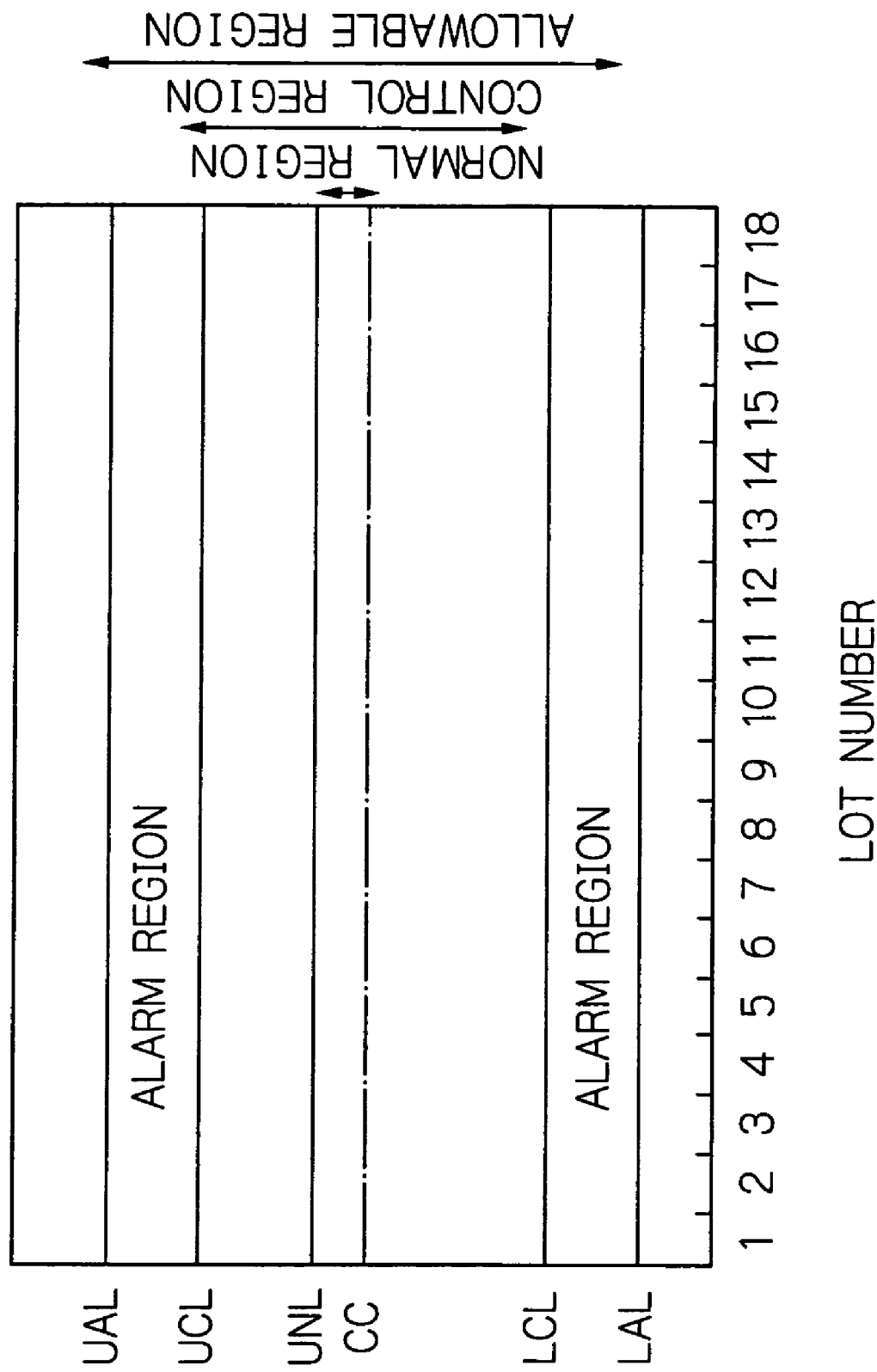

In FIG. 8, the normal region is provided to bridge the control center value CC. However, the normal region can be provided on one side of the control center value CC as illustrated in FIGS. 13 and 14. That is, in FIG. 13, the normal region is provided only below the control center value CC. In this case, step 920 of FIG. 9 reads M>CC. Similarly, in FIG. 14, the normal region is provided only above the control center value CC. In this case, step 911 of FIG. 9 reads M<CC.

Figure 15:
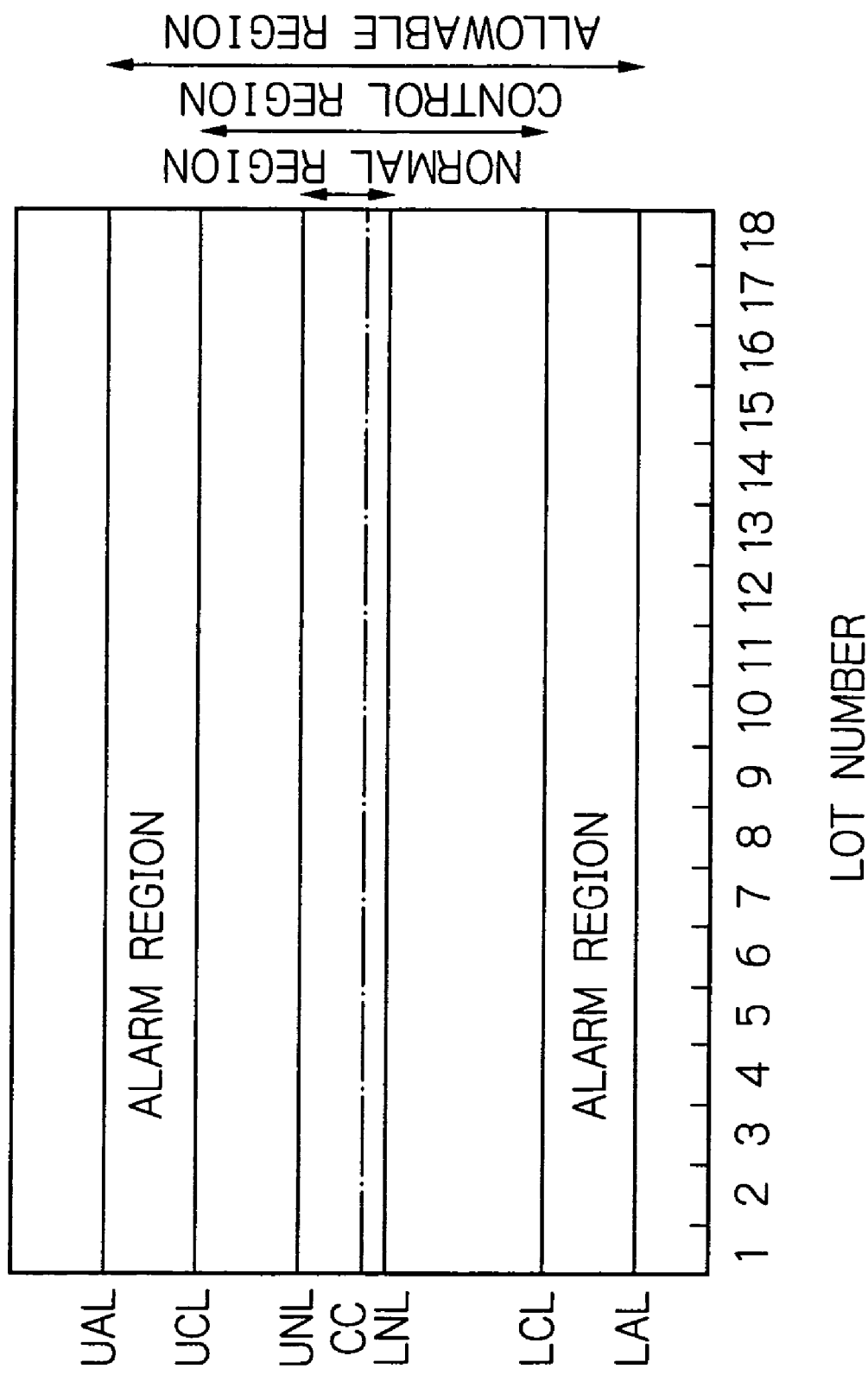

In FIG. 8, the normal region is symmetrical with respect to the control center value CC. However, the normal region can be asymmetrical with respect to the control center value CC as illustrated in FIG. 15. That is, in FIG. 15, the normal region above the control center value CC is wider than the normal region below the control center value CC. As a result, if the measured characteristic values M are slightly higher rather than lower with respect to the control center value CC in a normal state, unnecessary alarm signals can be effectively suppressed to decrease unnecessary countermeasure operation requests.

Note that the value "14" of steps 913 and 927 of FIG. 9 can be another value such as 3, 4, . . . . Also, the value "1" of step 915 and 924 can be another value such as 2, 3, . . . .

The invention claimed is:

1. A method for detecting abnormal characteristic values of at least three products sequentially manufactured in the same manufacturing line, comprising:
   detecting an alarm state when any characteristic value of sequentially-obtained characteristic values of said products is located within an alarm region outside a control region narrower than said allowable region;
   determining whether or not a successively-alternate increase/decrease tendency has occurred in said plurality of sequentially-obtained characteristic values of said products;
   detecting an alarm state when said successively-alternate increase/decrease tendency has occurred and at least one characteristic value is located within said control region and outside a normal region narrower than said control region; and
   suppressing an alarm state when said successively-alternate increase/decrease tendency has occurred and all of said sequentially-obtained characteristic values are located within said normal region.

2. The method as set forth in claim 1, further comprising generating an alarm signal when said alarm state is detected.

3. The method as set forth in claim 1, wherein a lower limit of said normal region is above a lower limit of said control region and below a control center value, and wherein an upper limit of said normal region is above said control center value and below an upper limit of said control region.

4. The method as set forth in claim 3, wherein a difference between the lower limit of said normal region and said control center value is different from a difference between said control center value and the upper limit of said normal region.

5. The method as set forth in claim 1, wherein a lower limit of said normal region is above a lower limit of said control region and below a control center value, and wherein an upper limit of said normal region is the same as said control center value.

6. The method as set forth in claim 1, wherein prior to determining whether or not a successively-alternate increase/decrease tendency has occurred, the method further comprises:
   detecting a defect state upon any characteristic value being located outside of said allowable region;
   generating a defect signal upon said defect state being detected;
   detecting an other alarm state upon any characteristic value being located inside said allowable region and outside said control region; and
   generating said alarm signal upon said other alarm state being detected.

7. An apparatus for detecting abnormal characteristic values of at least three products sequentially manufactured in the same manufacturing line, comprising:
   an alarm region detecting section for detecting an alarm state when any characteristic value of sequentially-obtained characteristic values of said products is located within an alarm region outside a control region narrower than said allowable region;
   a successively-alternate increase/decrease tendency determining section for determining whether or not a successively-alternate increase/decrease tendency has occurred in said plurality of sequentially-obtained characteristic values of said products; and
   a normal region determining section
   detecting an alarm state when said successively-alternate increase/decrease tendency has occurred and said at least one characteristic value is located within said control region and outside a normal region narrower than said control region, and
   suppressing an alarm state when said successively-alternate increase/decrease tendency has occurred and all of said sequentially-obtained characteristic values are located within said normal region.

8. The apparatus as set forth in claim 7, further comprising an alarm generating section for generating an alarm signal when said alarm state is detected.

9. The apparatus as set forth in claim 7, wherein a lower limit of said normal region is above a lower limit of said control region and below a control center value, and wherein an upper limit of said normal region is above said control center value and below an upper limit of said control region.

10. The apparatus as set forth in claim 7, wherein a difference between a lower limit of a normal region and said control center value is different from a difference between said control center value and an upper limit of said normal region.

11. The apparatus as set forth in claim 7, wherein a lower limit of said normal region is above a lower limit of said control region and below a control center value, and wherein an upper limit of said normal region is the same as said control center value.

12. The apparatus as set forth in claim 7, further comprising:
- a defect state detection section for detecting a defect state upon any characteristic value being located outside of said allowable region;
- a defect signal section generating a defect signal upon said defect state being detected by said defect state detection section;
- an alarm region detection section detecting an other alarm state upon any characteristic value being located inside said allowable region and outside said control region; and
- an alarm generating section for generating an alarm signal when said other alarm state is detected, wherein said defect state detection section said and said alarm region detection section interrogate said one of said characteristic values prior to said normal region determining section.

* * * * *